Patented June 17, 1924.

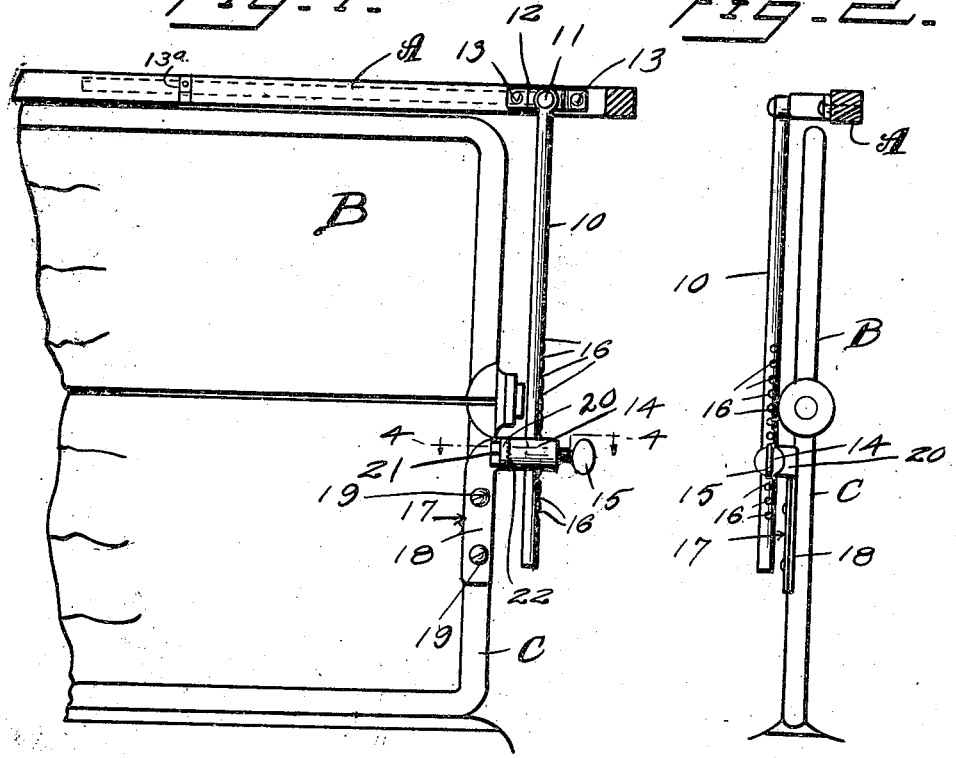
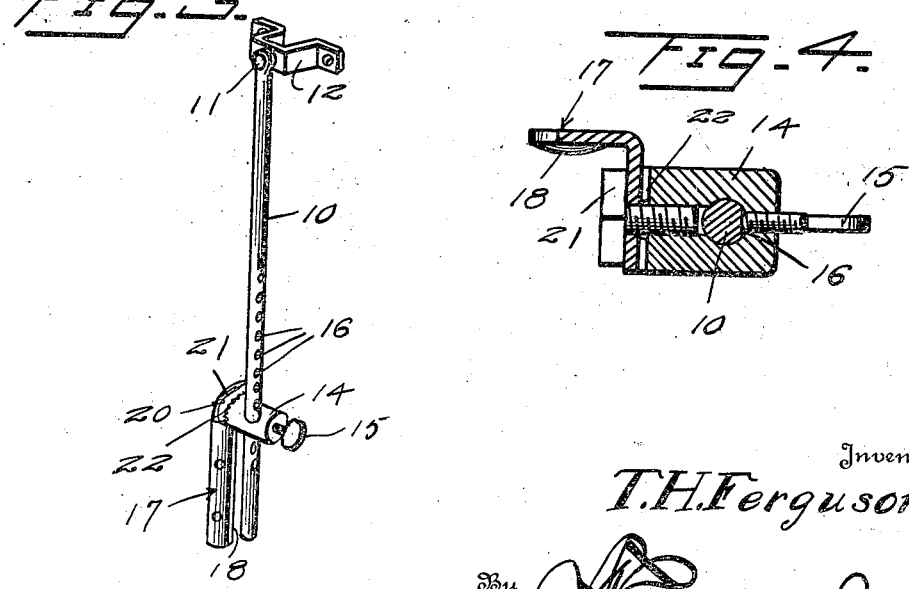

1,498,366

UNITED STATES PATENT OFFICE.

THOMAS H. FERGUSON, OF ANNA, ILLINOIS, ASSIGNOR OF FORTY-NINE ONE-HUN-
DREDTHS TO ED. SAMSON, OF ANNA, ILLINOIS.

ADJUSTABLE VEHICLE-TOP SUPPORT AND STRETCHER.

Application filed March 11, 1922. Serial No. 542,933.

*To all whom it may concern:*

Be it known that I, THOMAS H. FERGUSON, a citizen of the United States, residing at Anna, in the county of Union and State of Illinois, have invented certain new and useful Improvements in Adjustable Vehicle-Top Supports and Stretchers; and I do hereby declare the following to be a full, clear, and exact description of the invention, such as will enable others skilled in the art to which it appertains to make and use the same.

This invention relates to an adjustable vehicle top support and stretcher or tightener.

The invention particularly aims to provide a means which is accessible for ready manipulation to stretch and secure an automobile top or to release it for folding.

Another object is to provide a construction which is attachable to the wind shield of an automobile and includes a rod and fastening means therefor, with the latter adjustable to be alined with the former and preferably with the rod foldable against the top so as to facilitate compact folding of the latter.

Additional objects and advantages will become apparent from a consideration of the description following taken in connection with the accompanying drawings illustrating one practical embodiment.

In said drawings:

Fig. 1 is a front elevation showing the invention in place in connection with a part of an automobile shown fragmentarily;

Fig. 2 is a side elevation,

Fig. 3 is a perspective view of the device alone, and

Fig. 4 is a cross sectional view on the line 4—4 of Fig. 1.

Like reference characters designate like or similar parts in the different views.

An automobile top is shown in the drawings as at A and a wind shield at B having a mounting and reinforcing frame at C. The parts referred to are to be taken as conventional.

A fastening rod 10 is adapted to be secured in any suitable manner to the top A and depend therefrom adjacent one end of the wind shield B. This rod is preferably pivoted as at 11 to a bracket 12 so as to swing in a vertical plane. The bracket may be fastened as at 13 to the top A. When the rod 10 is not in fastened position, it may be swung to the dotted line position shown in Figure 1 where it is upheld by a resilient clip 13ª. Such compact disposition of the rod 10 facilitates folding of the cover A or in other words, prevents interference of the rod with folding of the cover.

Rod 10 is slidable through and separable from a securing member as designated at 14. The rod 10 is adapted to be secured in rigid relation to the securing member 14 as by means of a set screw 15 threaded in the latter and adapted to bind against the rod. A plurality of notches 16 may be provided at suitable intervals on the rod 10 to directly receive the set screw 15 and thus minimize the chances of relative movement of the rod 10 from a fastened position.

The securing member 14 may be mounted in any suitable manner. Preferably, such securing member is mounted by an attaching bracket 17, arcuate transversely at a limb 18 thereof, so as to snugly fit against a portion of the frame C. Set screws as at 19 may be employed to secure the limb 18 to the frame C. Bracket 17 has a laterally extending ear at 20 against which the securing member 14 is disposed and to which it is secured by means of a set screw 21 passing through the ear and into the securing member 14, being loose in the former and screw threaded in the latter. As a result of this construction, axial movement of the securing member 14 from a transverse axis is permissible so that the openings of the securing member 14 through which the rod 10 passes may be properly disposed according to the angularity of the rod 10 which will vary as is understood according to variation in the height of the rod. In order to prevent accidental slipping of the securing member, the engaging faces of the securing member and the ear 20 are preferably roughened or serrated for interengagement as at 22.

In use, it will be realized that the set screw 21 may be loosened so that the securing member 14 can be swung to the desired angle to receive the rod 10 and is turned to various positions as the rod is passed therethrough. The rod is then secured in the proper position rigid with the securing member 14 by adjustment of the set screw 15. The set screw 21 may also be tightened in order to secure the parts rigidly together and against vibration. Where the top A is to be folded, the set screw 15 is loosened and the set screw 21 is loosened so that the rod 10 may be readily removed from engagement with the eyelet 14 and then swung to the dotted line position of Figure 1 where it is upheld by the clip 13ª thus compactly folded against the top in order not to interfere with folding of the latter.

As merely one practical embodiment of the invention has been illustrated and described, it is to be understood that changes in the details may be resorted to provided they fall within the spirit and scope of the invention.

I claim as my invention:—

A top fastener having a top-securing rod, a securing member through which the rod is slidable, means to fasten said rod and member together, an attaching bracket having a limb for connection to a wind-shield frame, an ear integral with the limb and extending forwardly therefrom, said securing member being disposed against the outer side of the ear, and a fastening connecting the securing member to the ear and permitting adjustment of the securing member on an axis transverse to the path of movement of the rod.

In testimony whereof I affix my signature in the presence of two witnesses.

THOMAS H. FERGUSON.

Witnesses:
   WILLIS W. HILEMAN,
   ALLEN HARGRAVE.